(12) United States Patent
Maeda

(10) Patent No.: US 10,389,057 B2
(45) Date of Patent: Aug. 20, 2019

(54) CHARGER FOR MICROPHONE

(71) Applicant: AUDIO-TECHNICA CORPORATION, Machida-shi, Tokyo (JP)

(72) Inventor: Kenji Maeda, Machida (JP)

(73) Assignee: AUDIO-TECHNICA CORPORATION, Machida-Shi, Tokyo (JP)

( * ) Notice: Subject to any disclaimer, the term of this patent is extended or adjusted under 35 U.S.C. 154(b) by 0 days.

(21) Appl. No.: 16/104,236

(22) Filed: Aug. 17, 2018

(65) Prior Publication Data

US 2019/0109402 A1  Apr. 11, 2019

(30) Foreign Application Priority Data

Oct. 11, 2017 (JP) .................. 2017-197503

(51) Int. Cl.
| | | |
|---|---|---|
| *H01R 13/44* | (2006.01) | |
| *H01R 13/453* | (2006.01) | |
| *H01R 13/631* | (2006.01) | |
| *H01R 13/17* | (2006.01) | |
| *H04R 1/04* | (2006.01) | |
| *H02J 7/00* | (2006.01) | |

(52) U.S. Cl.
CPC ......... *H01R 13/4538* (2013.01); *H01R 13/17* (2013.01); *H01R 13/631* (2013.01); *H02J 7/0044* (2013.01); *H02J 7/0045* (2013.01); *H04R 1/04* (2013.01); *H04R 2420/07* (2013.01); *H04R 2420/09* (2013.01)

(58) Field of Classification Search
CPC ................................. H01R 13/4538
USPC ................................. 439/140, 141
See application file for complete search history.

(56) References Cited

U.S. PATENT DOCUMENTS

| | | | | |
|---|---|---|---|---|
| 5,178,552 A | * | 1/1993 | Jinno .................... | H01R 13/635 439/140 |
| 5,334,032 A | * | 8/1994 | Myers ................ | H01R 13/5219 439/140 |
| 5,437,558 A | * | 8/1995 | Sakuraoka ........... | H01R 13/631 439/140 |
| 5,466,164 A | * | 11/1995 | Miyazaki ........... | H01R 13/4538 439/140 |

(Continued)

FOREIGN PATENT DOCUMENTS

JP    H08-163784 A    6/1996

*Primary Examiner* — Neil Abrams
(74) *Attorney, Agent, or Firm* — Manabu Kanesaka

(57) ABSTRACT

A charger for the microphone of the present invention is provided with a case which has a grip insertion hole into which the grip portion of the microphone is inserted, wherein a pin support stand which supports the power supply side terminal pins below the grip insertion hole; a pin protection part, which has a pin insertion hole into which the power supply side terminal pins are inserted, and which is up/down moveable along the grip insertion hole; and an up/down guide means for guiding the pin protection part between an elevated position and a lowered position, are provided in the case, and at the time of non-charging, the pin protection part is moved to the elevated position such that the power supply side terminal pins are buried in the pin insertion holes, whereby the power supply side terminal pins are protected from external shocks.

7 Claims, 9 Drawing Sheets

(56) References Cited

U.S. PATENT DOCUMENTS

| | | | | |
|---|---|---|---|---|
| 5,944,542 A * | 8/1999 | Lee | .................... | H01R 13/4538 |
| | | | | 439/140 |
| 6,072,161 A * | 6/2000 | Stein | .................. | A47G 19/2288 |
| | | | | 219/386 |
| 6,139,349 A * | 10/2000 | Wright | ................. | H01R 13/635 |
| | | | | 439/271 |
| 6,176,712 B1 * | 1/2001 | Huang | ............... | H01R 13/4538 |
| | | | | 439/140 |
| 6,390,834 B1 * | 5/2002 | Hofmeister | ........ | H01R 13/4538 |
| | | | | 439/140 |
| 6,548,987 B1 * | 4/2003 | Oster | .................... | H02J 7/0045 |
| | | | | 320/114 |
| 6,846,191 B2 * | 1/2005 | Hobbs | ................ | H01R 13/4538 |
| | | | | 439/140 |
| 7,267,562 B2 * | 9/2007 | Katsuma | .............. | H01R 13/516 |
| | | | | 439/140 |
| 7,448,888 B2 * | 11/2008 | Okano | ............... | H01R 13/4538 |
| | | | | 439/157 |
| 7,670,177 B2 * | 3/2010 | Myer | ................ | H01R 13/4365 |
| | | | | 439/595 |
| 8,926,344 B2 * | 1/2015 | Jozwiak | .............. | B60R 16/0238 |
| | | | | 439/140 |

* cited by examiner

CHARGER FOR MICROPHONE

RELATED APPLICATIONS

The present application is based on, and claims priority from, Japanese Application No. JP2017-197503 filed Oct. 11, 2017, the disclosure of which is hereby incorporated by reference herein in its entirety.

TECHNICAL FILED

The present invention relates to a charger for a microphone, and more specifically, to techniques for protecting power supply side terminal pins from external shocks at the time of non-charging and at the same time for bringing microphone side charging terminals into contact with the power supply side terminal pins at correct positions thereof.

BACKGROUND ART

FIG. 8 illustrates an example of wireless microphones. The wireless microphone 100 is of handheld type and has a cylindrical grip portion 110 which is gripped by hand. The wireless microphone 100 is provided with a microphone unit 120 on one end (upper end) 111 of the grip portion 110 and with a transmitting portion 130 on the other end (lower end) 112 side of the grip portion 110. Although not shown, a secondary battery together with an audio signal output circuit, etc., are built into the grip portion 110.

As shown in FIG. 9A, the transmitting portion 130 includes a transmitting antenna 131. Preferably, the transmitting antenna 131 is provided on a bottom surface 113 side of the other end 112 of the grip portion 110 so that it is not covered by hand when the grip portion 110 is gripped by the hand.

In this example, the transmitting antenna 131 is configured with an elongated column 131a having electrical insulation and a coiled wire 131b wound therearound. As shown in FIG. 9B, on the bottom surface 113 of the grip portion 110 is provided an antenna cover 132 which covers the transmitting antenna 131. In this example, the antenna cover 132 is formed in a tongue shape with opposed two surfaces being generally flat and protruding from the bottom surface 113 of the grip portion 110.

The wireless microphone 100 is provided with charging terminals (a pair of positive side charging terminal and negative side charging terminal) for charging the secondary battery with the secondary battery built thereinto. As shown in FIGS. 9A and 9B, the positive side charging terminal and the negative side charging terminal 141 and 142 are located beside the antenna cover 132 within the bottom surface 113 of the grip portion 110.

Further, in this example, a battery common electrode terminal 143 and an ON/OFF control terminal 144 of the transmitting portion 130 besides the charging terminals 141, 142 are provided on the bottom surface 113 of the grip portion 110. Note that, if there is no need to differentiate these terminals 141, 142, 143, 144, they may be referred to collectively as microphone side terminal 140.

When the remaining amount of the built-in battery (secondary battery) becomes less than or equal to a predetermined level, the battery shall be charged. Many of the conventional chargers for wireless microphones are of standing type and they each have a recess into which the end of a grip portion is inserted and in which a power supply side terminal pin is provided corresponding to a microphone side charging terminal (see, e.g., Japanese Patent Laid-Open No. H8-163784).

However, the power supply side terminal pin, including a pin which expands and contracts due to a spring, is upstandingly provided such that it always protrudes from the bottom surface of the recess. Accordingly, they may be bent or broken if the external shocks are large enough due to rough handling, such as, e.g., throwing the grip portion into the recess.

Further, as the above-mentioned wireless microphone 100, in the model in which the antenna cover 132 is provided on the bottom surface 113 of the grip portion 110, the microphone side charging terminals may not be securely brought into contact with the power supply side terminal pins due to the presence of obstacles or antenna cover 132 thereof.

SUMMARY OF THE INVENTION

Consequently, the object of the present invention is to protect the power supply side terminal pins from external shocks at the time of non-charging in the charger for the microphone and to enable the microphone side charging terminals to be brought into contact with the power supply side terminal pins only in a correct position.

In order to solve the above-mentioned problems, the present invention is characterized by a charger for a microphone which has power supply side terminal pins that are brought into contact with charging terminals provided on the bottom surface of a grip portion of the microphone and which charges a secondary battery built into the microphone from the power supply side terminal pins via the charging terminals, the charger comprising: a case which has on its upper surface a grip insertion hole into which a lower end portion of the grip portion is inserted, wherein a pin support stand which supports the power supply side terminal pins at a predetermined lower position within the grip insertion hole such that the power supply side terminal pins exhibit in the grip insertion hole; a pin protection part, which has a pin insertion hole into which the power supply side terminal pins are inserted, and which is up/down moveable along the grip insertion hole at a position above the pin support stand; and a up/down guide means for guiding the pin protection part between an elevated position and a lowered position, are provided in the case, and wherein the up/down guide means, at the time of non-charging with the grip portion removed from the grip insertion hole, moves the pin protection part up to the elevated position such that the power supply side terminal pins are buried in the pin insertion holes, and then restricts the pin protection part at the same position, and at the time of charging with the grip portion inserted into the grip insertion hole, releases the restriction at the elevated position by the grip portion to make the pin protection part movable to the lowered position such that the tips of the power supply side terminal pins project from the pin insertion holes.

The present invention is characterized by the up/down guide means comprising: a guide arm which has a rotating shaft substantially horizontal to its upper end and which is provided with at its lower end a leg portion having a first sloping surface to move the pin protection part up and down, the guide arm being mounted at a predetermined position outside the grip insertion hole within the case so as to be rotatable around the rotating shaft such that the leg portion moves toward or away from the pin protection part; and a biasing means to bias the guide arm such that the leg portion moves toward the pin protection part side, and wherein the guide arm is provided with a protrusion which is retractable relative to the grip insertion hole and which is pressed back in a retraction direction by the grip portion being inserted into the grip insertion hole to thereby make the pin protection part movable to the lowered position.

The present invention is characterized in that the first sloping surface is a down slope in the forward tapered direction as viewed from above the grip insertion hole, wherein the pin protection part has a flange sliding on the first sloping surface, the upper end of the down slope being jointly provided with a horizontal surface on which the flange rides.

Further, the present invention is characterized in that the protrusion is provided with a second sloping surface on its tip portion, the second sloping surface being in the forward tapered direction with respect to the insertion direction of the grip portion into the grip insertion hole.

Further, the present invention is characterized in that the biasing means is a torsion spring which has a coiled portion fitted onto the rotation shaft and one end drawn from the coiled portion being latched at a predetermined site in the case and the other end drawn from the coiled portion being latched at the leg portion side.

A preferred aspect of the present invention is characterized in that the up/down guide means comprises a pair of up/down guide means as a left-and-right pair.

Further, the present invention is characterized in that the pin protection part has a guide hole into which a portion of the grip portion is inserted, wherein the profile of the grip portion and the hole shape of the guide hole are such that their shapes coincide with each other only when in a particular rotational position of the grip portion where the charging terminals and the power supply side terminal pins are opposed to one another, whereby a portion of the grip portion is insertable into the grip insertion hole up to a position abutting the protrusion only in the particular rotational position.

According to the present invention, at the time of non-charging with the grip portion of the microphone removed from the grip insertion hole, the pin protection part is restricted (locked) at the elevated position and the power supply side terminal pins are buried in the pin insertion holes of the pin protection part, whereas at the time of charging with the grip portion of the microphone inserted into the grip insertion hole, the insertion of the grip portion releases the restriction on the pin protection part to move the pin protection part downward such that the tips of the power supply side terminal pins project from the pin insertion holes. This makes it possible to protect the power supply side terminal pins from external shocks.

Further, the charger of the present invention is applicable to the microphone provided with the charging terminals on the bottom surface of the grip portion, the pin protection part has the guide hole into which a portion of the grip portion is inserted, and the profile of the grip portion and the hole shape of the guide hole are such that their shapes coincide with each other only in a particular rotational position of the grip portion where the charging terminals and the power supply side terminal pins are opposed to one another, whereby a portion of the grip portion is insertable into the grip insertion hole only in the particular rotational position. This makes it possible for the microphone side charging terminals to be brought into contact with the power supply side terminal pins only in a correct position.

BRIEF DESCRIPTION THE DRAWINGS

DETAILED DESCRIPTION

Next, with reference to FIG. 1 to FIG. 9, an embodiment of the present invention will be described, however, it the present invention is not limited to this.

Note that, a microphone which is to be charged by a charger according to this embodiment is the wireless microphone 100 which is provided with the transmitting portion 130 and the microphone side terminal 140 on the bottom surface of the grip portion 110. The transmitting form of the transmitting portion 130 may include infrared radiation besides the radio wave.

Figure 1:
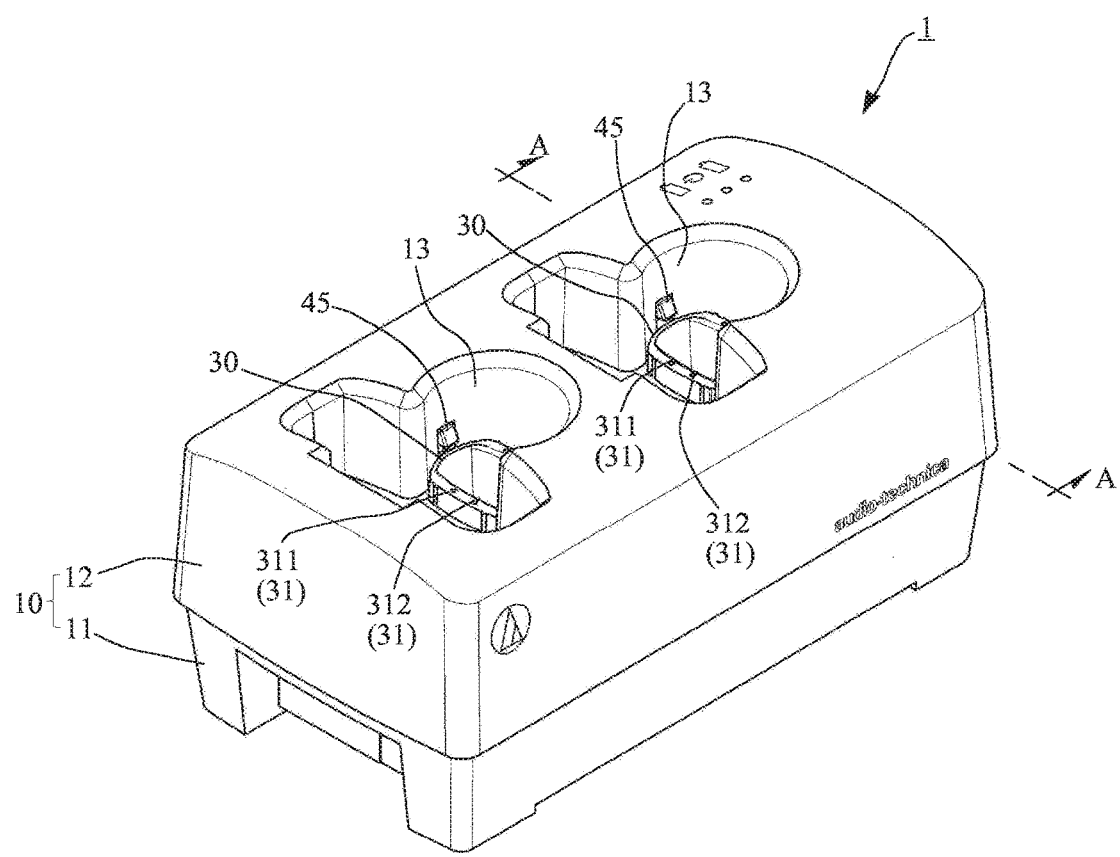
FIG. 1 is a perspective view illustrating an outline of a charger according to an embodiment of the present invention.
Figure 2:
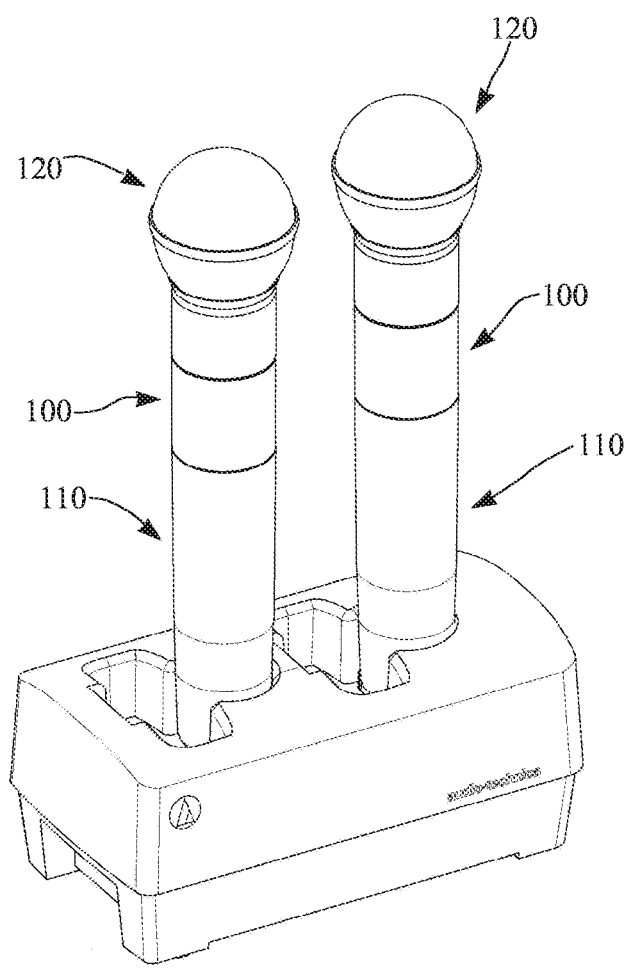
FIG. 2 is a perspective view illustrating a wireless microphone being charged in the above-mentioned charger.
Figure 3:
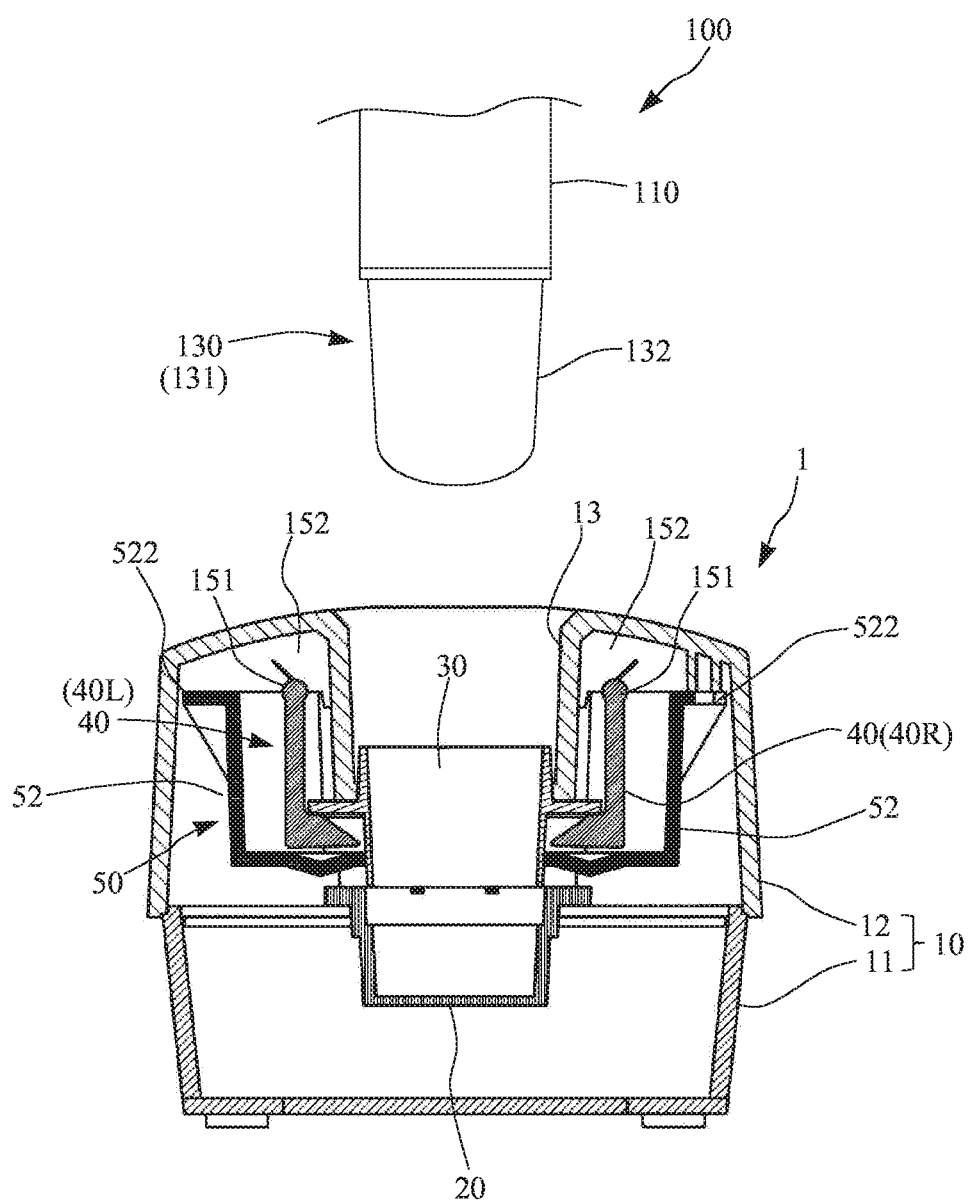
FIG. 3 is a schematic cross-sectional view taken along line A-A of FIG. 1 illustrating a main portion of the above-mentioned charger.

First, referring to FIG. 1 through FIG. 3, the charger 1 according to this embodiment is provided with a case 10 having a box shape. The case 10 consists of a combination of a bottom side lower box portion 11 and an upper box portion 12 which is covered on the lower box portion 11.

On an upper surface of the upper box portion 12 are provided one or more (two in this embodiment) grip insertion holes 13 into which a lower end side of the grip portion 110 of the wireless microphone 100 is inserted. The number thereof may be one, or three or more.

Figure 4:
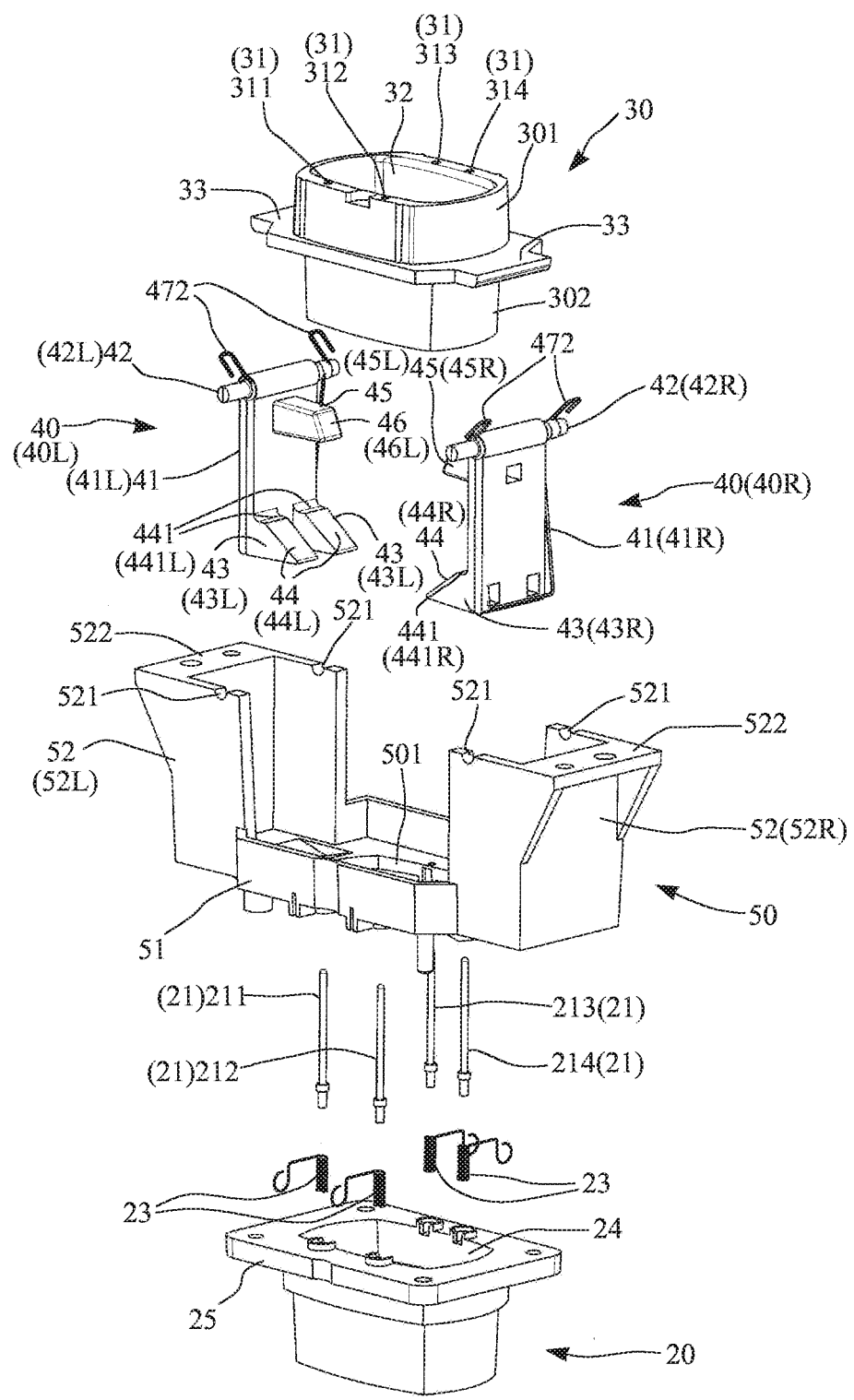
FIG. 4 is an exploded perspective view illustrating a main portion of the above-mentioned charger.
Figure 5:
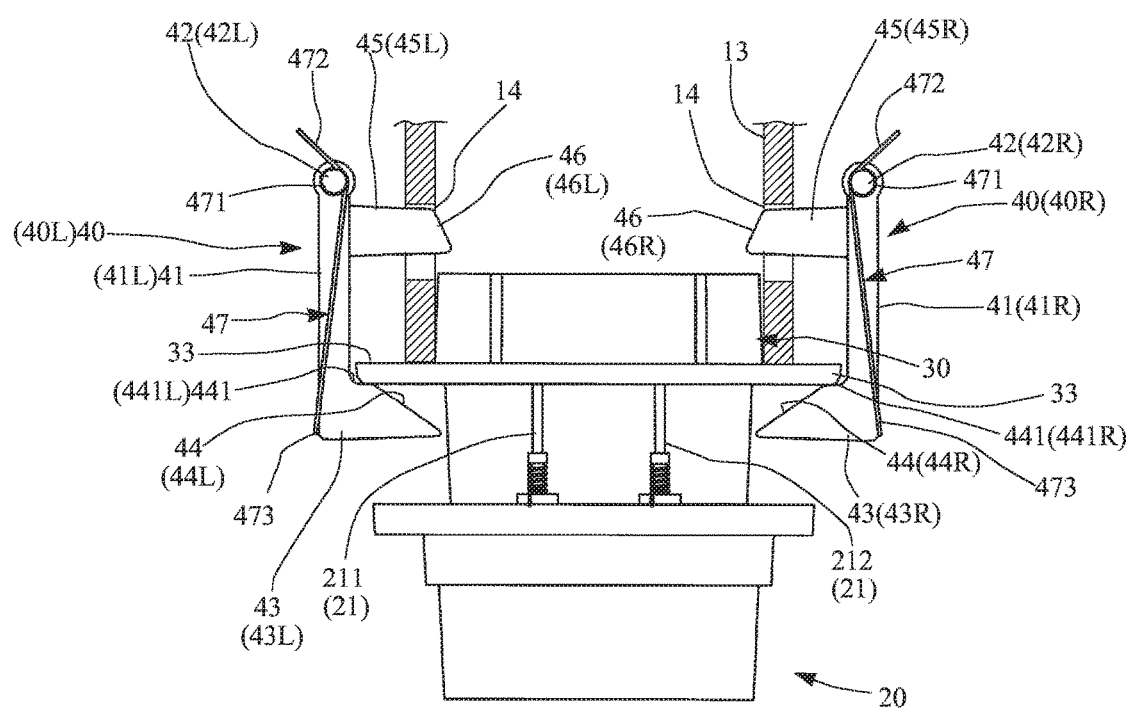
FIG. 5 is a schematic view illustrating a pin protection part at an elevated position at the time of non-charging in the above-mentioned charger.

Concurrently referring to FIG. 4 and FIG. 5, in the case 10 are provided a pin support stand 20, a pin protection part 30, an up/down guide means 40 for guiding the pin protection part 30 between an elevated position and a lowered position, and a support frame 50 for supporting the up/down guide means 40.

The pin support stand 20 is provided with four terminal pins, i.e., power supply side terminal pins 211, 212 respectively corresponding to the charging terminal 141, 142 of the above-mentioned microphone side terminals 140 explained in advance, a power supply side common terminal pin 213 corresponding to the battery common electrode terminal 143, and an ON/OFF control terminal pin 214 corresponding to the ON/OFF control terminal 144 of the transmitting portion 130.

If there is no need to differentiate these four terminal pins 211, 212, 213, 214, they may be referred to collectively as (a) power supply side terminal pin(s) 21. In this embodiment, each power supply side terminal pin 21 is upstandingly provided generally perpendicularly to the pin support stand 20 with a compression spring 23 attached to the lower portion thereof so as to resiliently abut the microphone side terminal 140.

The pin support stand 20 has at its central portion an opening portion 24 into which a later described second cylindrical portion 302 of the pin protection part 30 is fitted. Further, the upper edge of the opening portion 24 is formed with a flange 25. The pin support stand 20 is fixed to the lower box portion 11 via the flange 25 by screws, etc., such that the power supply side terminal pins 21 exhibit in the grip insertion hole 13 at a predetermined lower position within the grip insertion hole 13.

The pin protection part 30 is integrally formed with an upper side first cylindrical portion 301 and a lower side second cylindrical portion 302. The first cylindrical portion 301 and the second cylindrical portion 302 are coaxial and formed with a guide hole 32. An antenna cover 132 of the wireless microphone 100 is inserted into the guide hole 32. The guide hole 32 extends through the first cylindrical portion 301 and the second cylindrical portion 302.

The second cylindrical portion 302 is able to fit into the opening portion 24 of the pin support stand 20. The first cylindrical portion 301 is a cylinder having a thickness thicker than the second cylindrical portion 302. A flange 33 is integrally formed at the interface of the first cylindrical portion 301 and the second cylindrical portion 302.

The first cylindrical portion 301 is provided with four, i.e., first to fourth pin insertion holes 311, 312, 313, 314. The power supply side terminal pins 211, 212 of the power supply side terminal pins 21 are inserted into the first and second pin insertion holes 311, 312, respectively. The power supply side common terminal pin 213 is inserted into a third pin insertion hole 313. The ON/OFF control terminal pin 214 is inserted into the fourth pin insertion hole 314.

If there is no need to differentiate these pin insertion holes 311, 312, 313, 314, they may be referred to collectively as (a) pin insertion hole(s) 31. The pin protection part 30 is arranged above the pin support stand 20 so as to be up/down moveable along the grip insertion hole 13 with the power supply side terminal pins 21 inserted into the respective pin insertion holes 31.

At the time of non-charging or when the grip portion 110 of the wireless microphone 100 is removed from the grip insertion hole 13, as shown in FIG. 5, the up/down guide means 40 moves the pin protection part 30 up to the elevated position so that the power supply side terminal pins 21 are buried in the pin insertion holes 31, and then restricts (locks) it at this position.

Figure 6A:
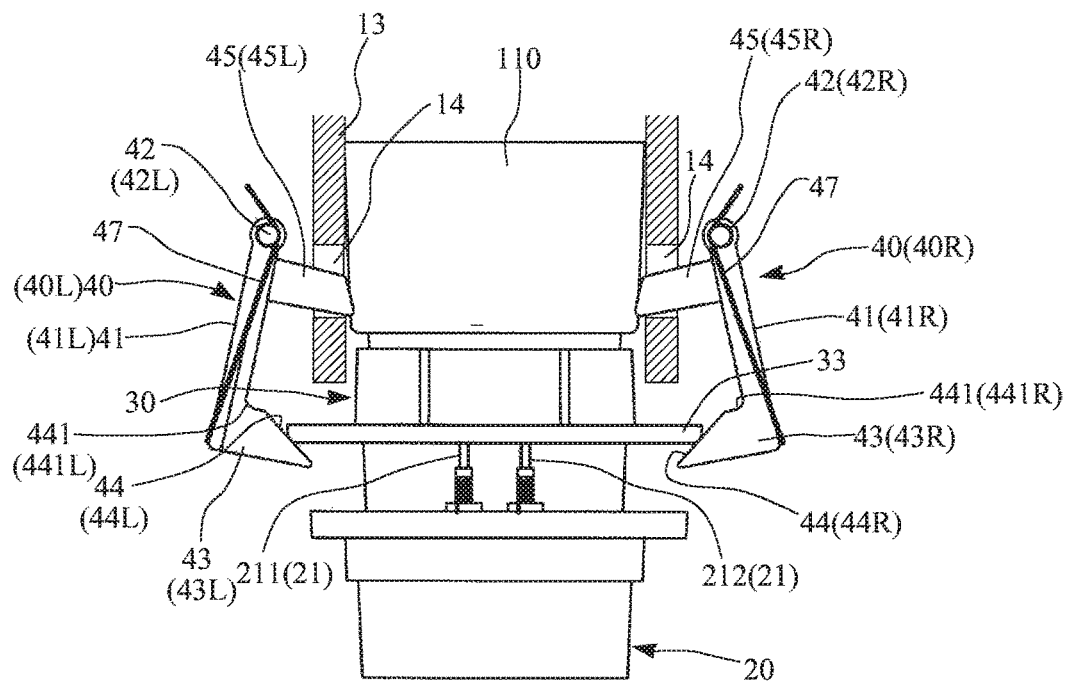
FIG. 6A is a schematic view illustrating the pin protection part pressed down by a grip at the time of charging in the above-mentioned charger and FIG. 6B is a schematic view illustrating power supply side terminal pins projecting at this time.
Figure 6B:
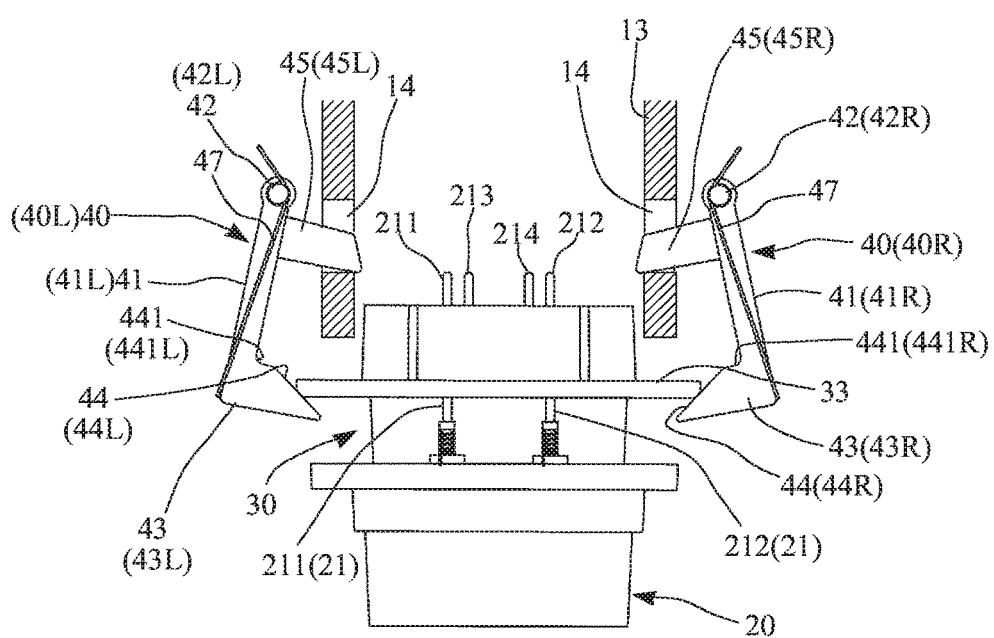

At the time of charging or when the grip portion 110 is inserted into the grip insertion hole 13, the restriction at the elevated position is cancelled and, as shown in FIGS. 6A, 6B, the pin protection part 30 is made to be movable to the lowered position so that the tips of the power supply side terminal pins 21 project from the pin insertion holes 31.

To this end, the up/down guide means 40 is/are provided with guide arms 41 which are arranged about the pin protection part 30. The up/down guide means 40 may be arranged on one side of the pin protection part 30. In this embodiment, the up/down guide means 40 are arranged on both sides across the pin protection part 30 as a left-and-right pair (40L, 40R).

The up/down guide means 40L, 40R are provided with guide arms 41L, 41R, respectively and have the same configuration with the exception that they are left-and-right symmetrically arranged, and therefore, if there is no need to differentiate them, they will be described as the guide arm 41.

Each guide arm 41 has a rotating shaft 42 substantially horizontal to its upper end and is provided with at its lower end a leg portion 43 having a sloping surface (first sloping surface) 44 to move the pin protection part 30 up and down.

Further, the guide arm 41 is provided with, preferably at the intermediate position (between upper and lower ends), a protrusion 45 which is retractable relative to the grip insertion hole 13. As shown in FIG. 5, the grip insertion hole 13 is formed with an opening 14 which enables the protrusion 45 to be retractable.

The guide arms 41 are provided on both left and right sides of the pin protection part 30 by the support frame 50. The support frame 50 is provided with a base frame 51 and side frames 52 (52L, 52R) upstandingly provided on both sides of the base frame 51.

On the central portion of the base frame 51 is provided an opening portion 501 into which the second cylindrical portion 302 of the pin protection part 30 can be fitted. The side frames 52L, 52R each include a frame body having a U-shaped cross section capable of containing the guide arm 41 and are arranged such that their opening surfaces are opposed to one another.

As shown in FIG. 3, on the upper end of the side frames 52L, 52R is provided a latch portion 522 for screwing the support frame 50 to a predetermined site in the upper box portion 12. Further, on the upper end of the side frames 52L, 52R are formed semi-circular bearing grooves 521 for rotatably supporting the rotating shafts 42 of the guide arms 41.

In contrast thereto, on the upper box portion 12 side are provided ribs 152 having semi-circular bearing grooves 151 which sandwich the rotating shafts 42 of the guide arm 41 with the above-mentioned bearing grooves 521 when the support frame 50 is screwed to the predetermined site in the upper box portion 12 (see FIG. 3). That is, the bearing grooves 151 and the bearing grooves 521 form bearing holes to rotatably support the rotating shafts 42.

In this way, the guide arms 41 are contained in the side frames 52 (52L, 52R) of the support frame 50 in a rotatable (pivotable) manner with the rotating shafts 42 as centers such that the leg portions 43 move toward or away from the pin protection part 30.

Further, the up/down guide means 40 is provided with a biasing means of biasing the guide arms 41 such that the leg portions 43 move toward the pin protection part 30 side. Referring to FIG. 5, this embodiment uses torsion springs 47 as the biasing means.

The torsion springs 47 are each provided with a coiled portion 471 which is fitted onto the rotating shaft 42 and with one end (upper end) 472 drawn from the coiled portion 471 which is latched at a predetermined site in the upper box portion 12 and the other end (lower end) 473 drawn from the coiled portion 471 which is latched on the leg portion 43 side. The torsion springs 47 always bias the leg portions 43 such that they move toward the pin protection part 30 side.

Note that, although not shown, in place of the torsion springs 47, compression springs or leaf springs may be provided between the inside of the side frame 52 of the support frame 50 and the rear of the guide arm 41 to bias the guide arm 41 to be moved toward the pin protection part 30 side.

The leg portions 43 of the guide arms 41 each are formed in a L-shape to project from the lower end portion of the guide arm 41 toward the pin protection part 30 side. Each sloping surface 44 is formed on the upper surface side of the leg portion 43 to be a down slope from the guide arm 41 toward the tip side of the leg portion 43 (down slope in the forward tapered direction when viewed from above the grip insertion hole 13).

The pin protection part 30 is arranged in the grip insertion hole 13 such that the flange 33 slides on the sloping surfaces 44 of the leg portions 43. The upper ends of the sloping surfaces 44 are jointly provided with horizontal surfaces 441 on which the flange 33 rides (see FIGS. 4 and 5).

Further, on the tip portion of the protrusion 45 retractably protrude in the grip insertion hole 13 is formed a sloping surface (second sloping surface) 46 in the forward tapered direction with respect to the insertion direction of the grip portion 110 of the wireless microphone 100 into the grip insertion hole 13.

At the time of non-charging or when the grip portion 110 of the wireless microphone 100 is removed from the grip insertion hole 13, as shown in FIG. 5, the left and right guide arms 41L, 41R are biased by the torsion springs 47 in directions of approaching one another. Subsequently thereto, the protrusions 45L, 45R also protrude in the grip insertion hole 13 through the openings 14.

Thereby, the pin protection part 30 is moved upward by the sloping surfaces 44L, 44R of the guide arms 41L, 41R through the flange 33 such that the tips of the power supply side terminal pins 21 are moved to a position where they are buried in the pin insertion holes 31 of the pin protection part 30. Thereby, the power supply side terminal pins 21 are protected from external shocks, etc.

In this elevated position, the flange 33 rides on the horizontal surfaces 441L, 441R jointly provided with the upper ends of the sloping surfaces 44L, 44R, and thereby, the pin protection part 30 is securely restricted (locked) at its elevated position.

Next, referring to FIGS. 6A and 6B, when the grip portion 110 of the wireless microphone 100 is inserted into the grip insertion hole 13 for charging, the protrusions 45L, 45R abut the grip portion 110 and are thereby pressed back, and then, the guide arms 41L, 41R open against biasing forces of the torsion springs 47 in directions away from one another with the rotating shafts 42L, 42R as rotation centers.

Thereby, the flange 33 of the pin protection part 30 is disengaged from the horizontal surfaces 441L, 441R and the restriction at the elevated position is released, and thus, the pin protection part 30 is moved down along the sloping surface 44 by its own weight. Note that, depending on a sliding frictional force generated between the flange 33 and the sloping surface 44, the pin protection part 30 may be configured to be moved down along the sloping surface 44 by the use of the force pushing the grip portion 110 downward.

In any event, as shown in FIG. 6B, the pin protection part 30 is moved to the lowered position such that the tips of the power supply side terminal pins 21 project from the pin insertion holes 31, and then, the power supply side terminal pins 21 and the microphone side terminals 140 are brought into contact with one another and thereby the charging is performed.

After the end of charging, when the grip portion 110 is pulled out from the grip insertion hole 13 to release the restriction on the protrusions 45L, 45R, the guide arms 41L, 41R rotate by the biasing forces of the torsion spring 47 in directions approaching one another with the rotating shafts 42L, 42R as rotation centers.

Thereby, the flange 33 of the pin protection part 30 rises on the sloping surfaces 44L, 44R of the guide arms 41L, 41R, and then, as shown in FIG. 5, it is raised up to the elevated position leading to the horizontal surfaces 441L, 441R.

In this way, at the time of non-charging, the power supply side terminal pins 21 are buried in the pin insertion holes 31 of the pin protection part 30, and, only at the time of charging, they project from the pin insertion holes 31 of the pin protection part 30. This configuration protects the power supply side terminal pins 21. It is necessary that the microphone side terminals 140 are brought into contact with the power supply side terminal pins 21 only when they are in the correct position.

Namely, in order to prevent incorrect contacts, it is necessary that the charging terminals 141, 142 and the power supply side terminal pins 211, 212 are able to contact with one another, that the battery common electrode terminal 143 and the power supply side common terminal pin 213 are able to contact with one another, and that the ON/OFF control terminal 144 and the ON/OFF control terminal pin 214 are able to contact with one another.

Figure 7A:
FIG. 7A is a schematic view illustrating a first example of shapes where a guide hole of the pin protection part and a transmitting portion coincide with one another only at a particular rotational position and FIG. 7B is a schematic view illustrating a second example thereof.
Figure 7A:
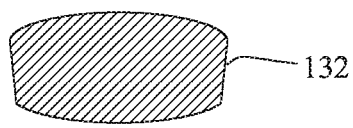

Therefore, in this embodiment, as shown in FIG. 7A, the guide hole 32 of the pin protection part 30 and the antenna cover 132 of the wireless microphone 100 have deformed trapezoidal shapes in which upper and lower sides slightly bulge outward in their cross sections.

With these shapes thus formed, only when in a particular rotational position (rotational position around an axis of the grip portion 110), the antenna cover 132 is insertable into the guide hole 32 to insert the grip portion 110 up to a position where the protrusions 45L, 45R are pressed back.

In contrast thereto, when the antenna cover 132 is rotated from the position shown in FIG. 7A by, e.g., 180 degrees, the antenna cover 132 is not insertable into the guide hole 32. Thereby, it is not possible for the grip portion 110 to press back the protrusions 45L, 45R and thus to press down the pin protection part 30 to the lowered position.

Figure 7B:
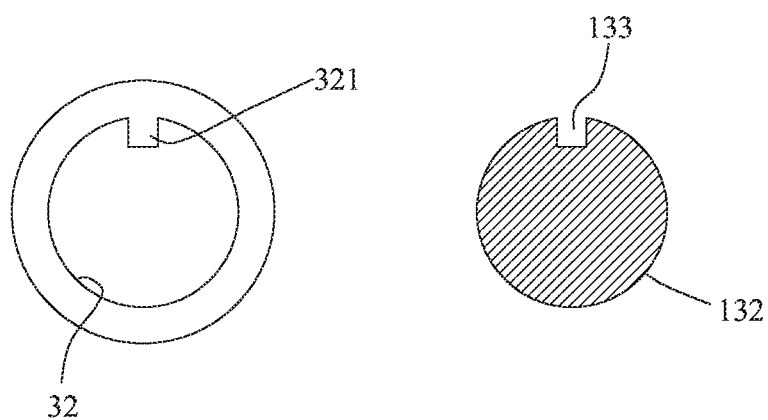
Figure 8:
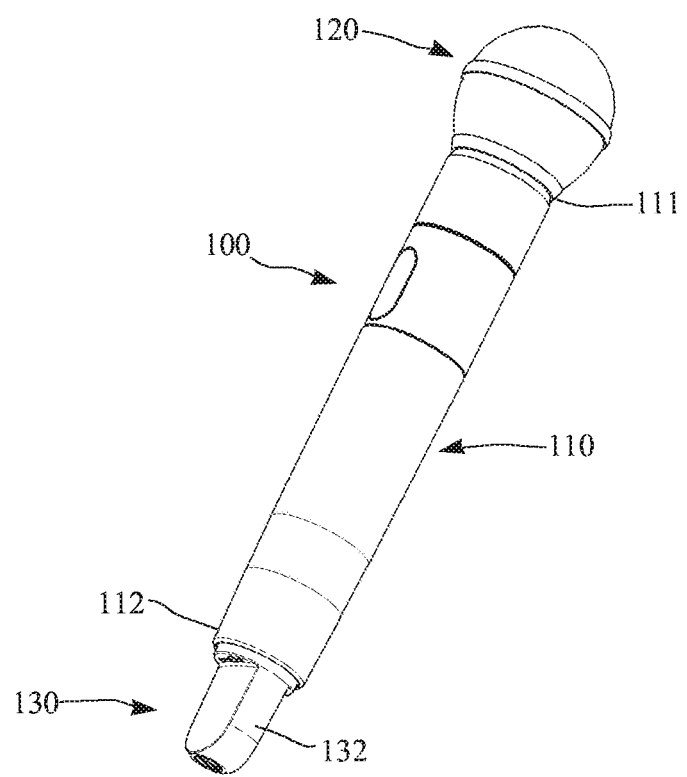
FIG. 8 is a perspective view illustrating an outline of a wireless microphone having a transmitting portion on a bottom surface of the grip.
Figure 9A:
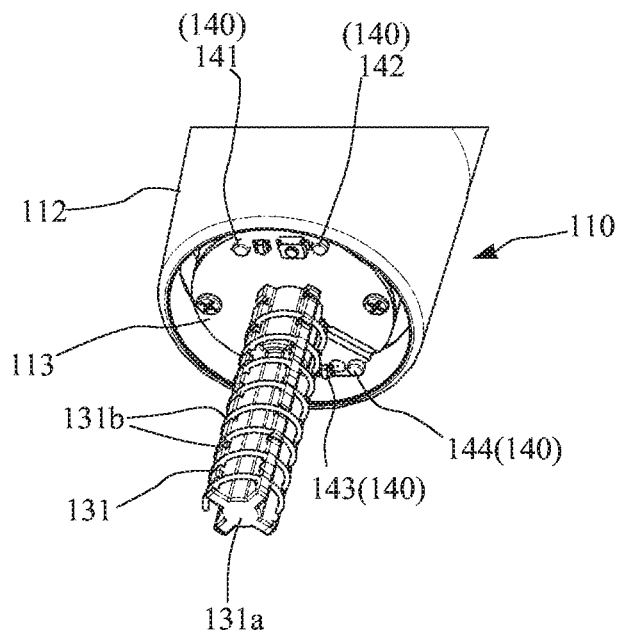
FIG. 9A is a perspective view illustrating a transmitting antenna provided on the above-mentioned transmitting portion and FIG. 9B is a perspective view illustrating the transmitting antenna covered by an antenna cover.
Figure 9B:
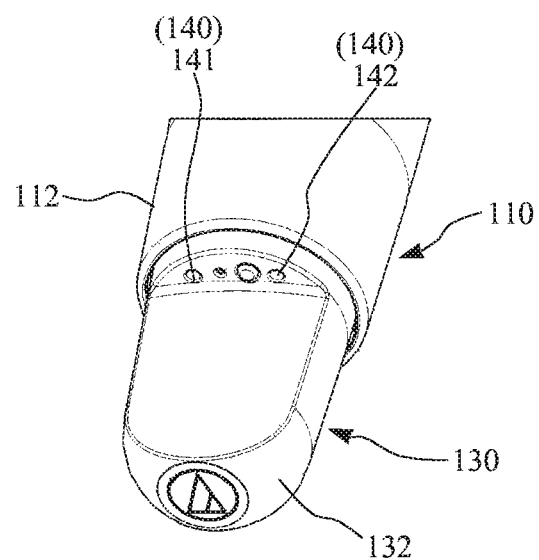

As another example, as shown in FIG. 7B, the guide hole 32 and the antenna cover 132 have circular cross sections likewise and the guide hole 32 is provided with a key 321 partly formed in its inner surface. On the other hand, a key slot 133 which engages the key 321 may be formed on the antenna cover 132 side such that, only in a particular position where the key 321 and the key slot 133 coincide with one another, the antenna cover 132 is insertable into the guide hole 32.

Note that, in the above-mentioned embodiment, the charging is intended for the wireless microphone 100 whose transmitting portion 130 is provided in a protruding manner on the bottom surface of the grip portion 110. However, regardless of the presence or absence of a transmitting portion, the charger of the present invention is applicable to a microphone which at least has charging terminals on the bottom surface of the grip portion 110.

As an example, the lower portion of the grip portion 110 and the guide hole 32 may be configured as a combination of the shapes shown in FIGS. 7A, 7B, such that, only in a particular rotational position, a portion of the grip portion 110 is insertable into the guide hole 32. This aspect is included in the present invention. Further, the same can be said with respect to a wired microphone with a secondary battery built therein.

As described above, according to the present invention, at the time of non-charging with the grip portion 110 of the microphone removed from the grip insertion hole 13, the pin protection part 30 is restricted (locked) at the elevated position and the power supply side terminal pins 21 are buried in the pin insertion holes 31 of the pin protection part 30, whereas at the time of charging with the grip portion 110 of the microphone inserted into the grip insertion hole 13, the insertion of the grip portion 110 releases the restriction on the pin protection part 30 to move the pin protection part 30 downward such that the tips of the power supply side terminal pins 21 project from the pin insertion holes 31. This makes it possible to protect the power supply side terminal pins 21 from external shocks.

Further, the charger 1 of the present invention is applicable to the microphone provided with the charging terminals 141, 142 on the bottom surface of the grip portion 110, the pin protection part 30 has the guide hole 32 into which a portion of the grip portion 110 is inserted, and the profile of the grip portion 110 and the hole shape of the guide hole 32 are such that their shapes coincide with each other only in a particular rotational position of the grip portion 110 where the charging terminals 141, 142 and the power supply side terminal pins 211, 212 are opposed to one another, whereby a portion of the grip portion 110 is insertable into the grip insertion hole 13 only in the particular rotational position. This makes it possible for the microphone side charging terminals 141, 142 to be brought into contact with the power supply side terminal pins 211, 212 only in a correct position.

The invention claimed is:

1. A charger for a microphone which has power supply side terminal pins that are brought into contact with charging terminals provided on a bottom surface of a grip portion of the microphone and which charges a secondary battery built into the microphone from the power supply side terminal pins via the charging terminals, the charger comprising:
a case which has on its upper surface a grip insertion hole into which a lower end portion of the grip portion is inserted, wherein
a pin support stand which supports the power supply side terminal pins at a predetermined lower position within the grip insertion hole such that the power supply side terminal pins exhibit in the grip insertion hole;
a pin protection part, which has a pin insertion hole into which the power supply side terminal pins are inserted, and which is up/down moveable along the grip insertion hole at a position above the pin support stand; and
an up/down guide means for guiding the pin protection part between an elevated position and a lowered position, are provided in the case, and
wherein the up/down guide means,
at the time of non-charging with the grip portion removed from the grip insertion hole, moves the pin protection part up to the elevated position such that the power supply side terminal pins are buried in the pin insertion holes, and then restricts the pin protection part at the same position, and
at the time of charging with the grip portion inserted into the grip insertion hole, releases the restriction at the elevated position by the grip portion to make the pin protection part movable to the lowered position such that the tips of the power supply side terminal pins project from the pin insertion holes.

2. The charger for the microphone according to claim 1, wherein the up/down guide means comprises:
a guide arm which has a rotating shaft substantially horizontal to its upper end and which is provided with at its lower end a leg portion having a first sloping surface to move the pin protection part up and down, the guide arm being mounted at a predetermined position outside the grip insertion hole within the case so as to be rotatable around the rotating shaft such that the leg portion moves toward or away from the pin protection part; and
a biasing means to bias the guide arm such that the leg portion moves toward the pin protection part side, and
wherein the guide arm is provided with a protrusion which is retractable relative to the grip insertion hole and which is pressed back in a retraction direction by the grip portion being inserted into the grip insertion hole to thereby make the pin protection part movable to the lowered position.

3. The charger for the microphone according to claim 2, wherein the first sloping surface is a down slope in the forward tapered direction as viewed from above the grip insertion hole, and
wherein the pin protection part has a flange sliding on the first sloping surface, the upper end of the down slope being jointly provided with a horizontal surface on which the flange rides.

4. The charger for the microphone according to claim 3, wherein the protrusion is provided with a second sloping surface on its tip portion, the second sloping surface being in the forward tapered direction with respect to the insertion direction of the grip portion into the grip insertion hole.

5. The charger for the microphone according to claim 2, wherein the biasing means is a torsion spring which has a coiled portion fitted onto the rotation shaft and one end drawn from the coiled portion being latched at a predetermined site in the case and the other end drawn from the coiled portion being latched at the leg portion side.

6. The charger for the microphone according to claim 2, wherein the up/down guide means comprises a pair of up/down guide means as a left-and-right pair.

7. The charger for the microphone according to claim 2, wherein the pin protection part has a guide hole into which a portion of the grip portion is inserted,
wherein a profile of the grip portion and a hole shape of the guide hole are such that their shapes coincide with each other only in a particular rotational position of the grip portion where the charging terminals and the power supply side terminal pins are opposed to one another, whereby a portion of the grip portion is insertable into the grip insertion hole up to a position abutting the protrusion only in the particular rotational position.

* * * * *